United States Patent [19]

Evans, Jr.

[11] Patent Number: 4,893,068

[45] Date of Patent: Jan. 9, 1990

[54] DIGITAL SERVO EMPLOYING SWITCH MODE LEAD/LAG INTEGRATOR

[75] Inventor: Daniel D. Evans, Jr., Oceanside, Calif.

[73] Assignee: Hughes Aircraft Company, Los Angeles, Calif.

[21] Appl. No.: 271,477

[22] Filed: Nov. 15, 1988

[51] Int. Cl.[4] .................................................. G05B 5/01
[52] U.S. Cl. .................................... 318/615; 318/618; 318/610; 318/561
[58] Field of Search ............................... 318/600–637, 318/560–574, 685, 696

[56] References Cited

U.S. PATENT DOCUMENTS

| | | | |
|---|---|---|---|
| 3,633,086 | 1/1972 | Speth | 318/561 X |
| 4,713,596 | 12/1987 | Bose | 318/561 X |
| 4,754,208 | 6/1988 | Nakajima et al. | 318/632 X |
| 4,816,734 | 3/1989 | Kurakake et al. | 318/618 X |
| 4,843,293 | 6/1989 | Futami | 318/610 X |

Primary Examiner—William M. Shoop, Jr.
Assistant Examiner—Paul Ip
Attorney, Agent, or Firm—Joseph E. Szabo; Wanda K. Denson-Low

[57] ABSTRACT

A digital servo system for causing a mechanical element (48) to track a desired path and hold various positions along the path and employing a lead/lag integrator (18) in parallel with a feedback control loop. The input to the integrator (18) is switched between velocity ($V_{EK}$) error during pathtracking and position error ($E_K$) during holding to increase the resistance of the mechanical element (48) to position changes caused by outside forces during both pathtracking and holding. The integrator function employed uses a term ($U_{integrator(k-1)}$) representing a previous integrator output value to assist in smoothing perturbations caused by switching between position and velocity error.

26 Claims, 4 Drawing Sheets

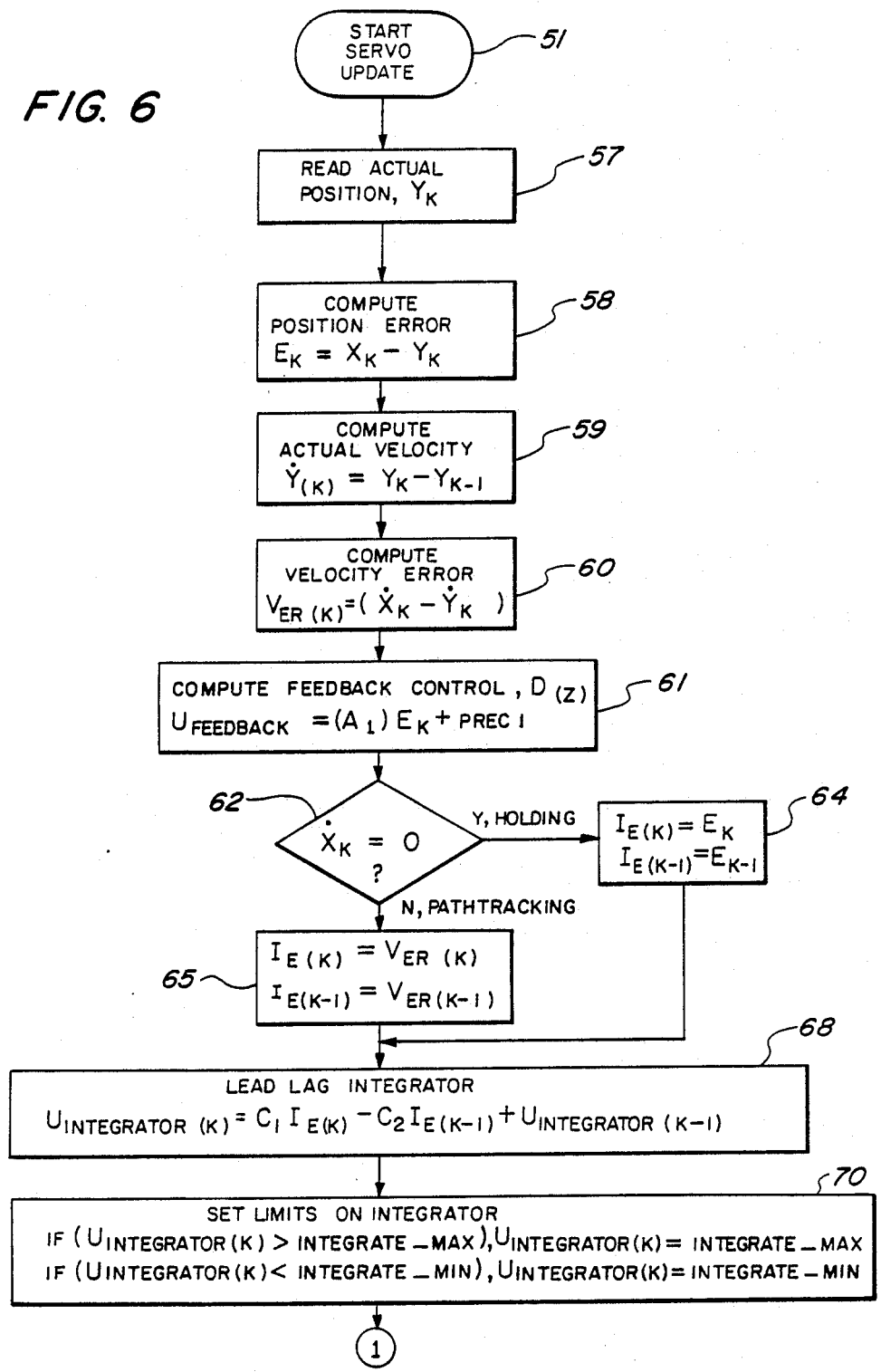

DIGITAL SERVO EMPLOYING SWITCH MODE LEAD/LAG INTEGRATOR

BACKGROUND OF THE INVENTION

1. Field of the Invention

The subject invention relates generally to servo positioning systems, and more particularly to a digital servo positioning system employing a lead/lag integrator to achieve high stiffness during both path tracking and holding.

2. Description of Related Art

Prior art servo position control systems are known wherein a control system moves a mechanical element so as to track a designated path and hold the element at selected points along the path. The concept of "stiffness" in such systems implies a high resistance to external forces which would move the element from its chosen path.

Prior art servo position control systems commonly employ so-called "PID" control wherein an error signal is provided and individual control signals are generated. These individual control signals are typically proportional to the error signal, the integral of the error signal, and the derivative of the error signal. In such systems the integrator which provides the integral of the error signal is typically nested within a feedback compensator, is constrained to integrate the error signal, which typically represents position error.

Either position integration or velocity integration has its drawbacks. Systems which use only position error integration are susceptible to "windup overcompensation," especially during pathtracking, which leads to large position overshoots and oscillations at the end of the move when holding is required. Velocity error integration increases system stiffness during pathtracking, while significantly reducing windup overcompensation compared to position integration. However, velocity integration yields unsatisfactory holding stiffness for many applications. Using both velocity error and position error integration at the same time introduces conflicting control signals under some conditions, which compromises optimal system performance.

SUMMARY OF THE INVENTION

It is therefore an object of the invention to improve servo positioning systems;

It is another object of the invention to increase stiffness of such systems during holding and pathtracking;

It is another object of the invention to employ both position and velocity integration in a servo positioning system in such a manner that stiffness is improved during both holding and pathtracking; and It is another object of the invention to provide an improved servo position system adaptable to digital implementation.

According to the invention, the integrator in a position control servo system is moved out of the feedback loop and placed in parallel therewith. This placement permits switching the integrator input from velocity error during pathtracking to position error during holding, resulting in superior stiffness in both the holding and moving states. The scheme is adaptable to a wide range of multiple axis incremental motion control systems where high stiffness is required during path tracking and holding. A feature of the particular switch mode integrator employed is that a new integrator output value is always dependent on the new integrator input plus the old integrator output value, a feature which smooths perturbations which might be introduced by switching between position and velocity error.

BRIEF DESCRIPTION OF THE DRAWINGS

The just-summarized invention will now be described in detail in conjunction with the drawings of which:

FIGS. 6 and 7 are flow charts illustrating programming of the digital processor of FIG. 5.

DETAILED DESCRIPTION OF THE PREFERRED EMBODIMENTS

Figure 1:
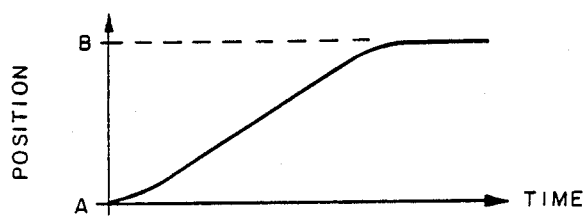
FIG. 1 is a graph illustrating a position trajectory profile.
Figure 2:
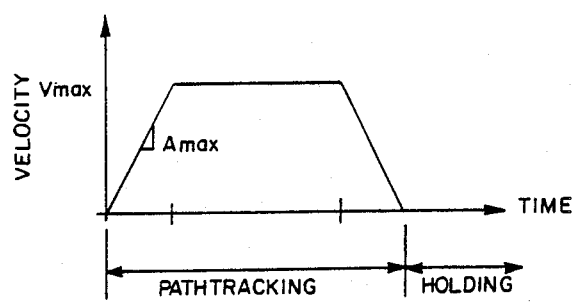
FIG. 2 is a graph illustrating a velocity trajectory profile.

A typical incremental or digital servo positioning system performs moves of a mechanical element such as a robot arm from position A to position B along some prescribed path, as shown in FIG. 1. This path has some inherent velocity profile as shown in FIG. 2. The position and velocity profiles in FIGS. 1 and 2 only illustrate one possible trajectory path. Most applications of such digital servo positioning systems require very high position accuracy and holding stiffness at the end positions A and B where the velocity of the element is zero. High stiffness during pathtracking, i.e., when velocity of the element is nonzero, is also required to minimize the effect of external disturbances on system performance. A servo positioning system which employs a switch mode integrator to generate a control signal $U_{total}$ for maintaining stiffness of a mechanical element both at the end positions A, B and during pathtracking is shown in FIG. 3.

Figure 3:
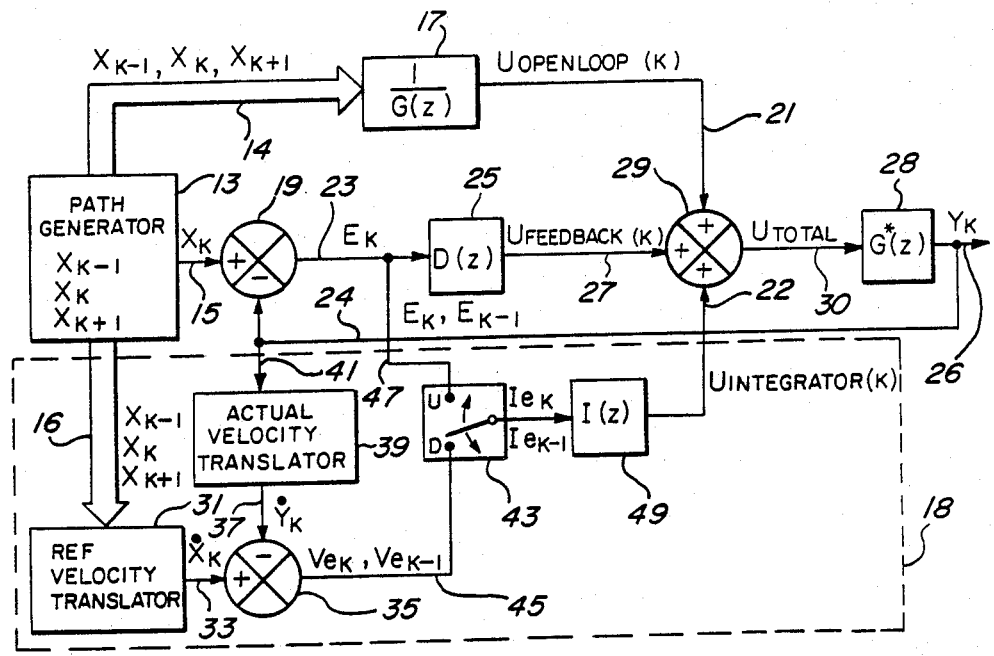
FIG. 3 is a schematic block diagram of a digital servo position system a switch mode integrator according to the embodiment.

The system of FIG. 3 includes a path generator 13, which generates path data comprising path position signals $X_{k-n}$, the path position data for one-dimensional path motion. The path position signals $X_{k-n}$ indicate the desired position of a mechanical element or member included in the system plant 28. The path generator 13 outputs the desired path position signals $X_{k-1}$, $X_k$, $X_{k+1}$ and $X_k$ over three output lines 14, 15, 16 to a computing element 17, a switch mode integrator 18, and a summer 19.

The computing element 17 applies a transfer function $1/G(Z)$ to the path data and outputs an open loop control voltage $U_{openloop(k)}$ on an output line 21. The switch mode integrator 18 supplies an integrator control voltage $U_{integrator(k)}$ on an output line 22. The summer 19 outputs an error signal $E_k$ on a line 23 to a computational element 25. The computational element 25 applies a feedback control transfer function $D(Z)$ on the input error signal $E_k$ and outputs a feedback control voltage $U_{feedback(k)}$ on an output line 27.

The three output lines 21, 23, 27 are connected to a summer 29 which adds the open loop, feedback and integrator control voltages $U_{openloop(k)}$, $U_{feedback(k)}$, $U_{in-}$ tegrator(k) to produce a total output control voltage $U_{total(k)}$ on an output line 30. The output control voltage $U_{total(k)}$ on the output line 30 is applied to the system plant 28, resulting in an actual path location of the mechanical element of the plant 28 represented by an actual position signal $Y_k$. This actual position signal $Y_k$ is outputted on a line 26, and is also fed back over line 24 to the first summer 19 and subtracted from the desired path signal $X_k$ to yield the feedback error signal $E_k$, where $E_k = X_k - Y_k$. The transfer function of the actual plant 28 is represented by $G^*(Z)$.

The switch mode integrator 18 includes a reference velocity translator 31 receiving the path location data $X_{k-1}, X_k, X_{k+1} \ldots$, and outputting commanded velocity data $\dot{X}_k$ over a line 33 to a third summer 35. As used throughout, the subscript k indicates the value of the variable, e.g., X, during various time intervals or "iterations." For example, the subscripts (k−1) and (k+1) indicate the values of the variable during intervals immediately preceding and succeeding time interval k. The third summer 35 receives a second input $\dot{Y}_k$ on a line 37 from an actual velocity translator 39 which is connected to receive the actual position data $Y_k$ over a line 41 and calculates the actual velocity $\dot{Y}_k$ according to the expression $\dot{Y}_k = Y_k - Y_{k-1}$. The velocity error output $V_{e(k)}, V_{e(k-1)}$ of the third summer 35 is supplied to switch control logic 43 over a line 45. The switch control logic 43 receives a second input comprising the position error signals $E_k, E_{k-1}$ over a line 47 and supplies an integrator input error signal $I_{e(k-1)}, I_{ek}$ to a lead/lag integrator 49.

In operation of the system of FIG. 3, the path generator 13 supplies the reference positions, $X_k$, equally spaced in time. The actual positions, $Y_k$, are subtracted from the reference positions to yield the position error signals, $E_k = X_k - Y_k$. The position error is compensated using a conventional lead/lag control, D(z), according to the difference equation, $U_{feedback(k)} = A_1 E_k - A_2 E_{k-1} + A_3 U_{feedback(k-1)}$, where $A_1$, $A_2$, and $A_3$ are constants. In conventional control systems, this signal $U_{feedback(k)}$ is the only component of $U_{total(k)}$ and is sent out to the plant, $G^*(z)$ which may comprise, for example, an amplifier, a motor, and a load. The system in FIG. 3, however, employs two additional components to determine $U_{total(k)}$. The first additional component, the open loop control signal, $U_{openloop(k)}$, is added to reduce the pathtracking errors inherent in feedback control systems. This open loop control signal is not essential to advantageous use of the switch mode integrator 18 of the preferred embodiment.

The switch mode integrator control signal, $U_{integrator(k)}$, is added to supply stiffness during holding and pathtracking within the plant $G^*(z)$. The integrator 49 is a lead/lag integrator of the form, $U_{integrator(k)} = C_1 I_{ek} - C_2 I_{e(k-)} + U_{integrator(k-1)}$, where $C_1$ and $C_2$ are constants and where the input integrator error signal, $I_{ek}$, is either a velocity error signal, $V_{ek}$, or a position error signal, $E_k$, as determined by the switch 43. The conditions for operation of the switch 43 are:

If $(\dot{X}_k \neq 0)$
  switch to "D," $V_{ek}, V_{ek-1}$
else
  switch to "U," $E_k, E_{k-1}$
where $\dot{X}_k$ is the commanded velocity.

The reference velocity translator 31 generates commanded velocities represented by velocity signals, $\dot{X}_k$, from position references, $X_k$, while the actual velocity translator 39 calculates actual velocity signals, $\dot{Y}_k$, from actual positions, $Y_k$. Velocity error signals, $V_{ek}$, are computed by the summer 35 from the reference and actual velocities, $V_{ek} = \dot{X}_k - \dot{Y}_k$. The switch mode integrator 18 integrates velocity error, $V_{ek}$, during pathtracking, and position error, $E_k$, during holding.

Figure 4:
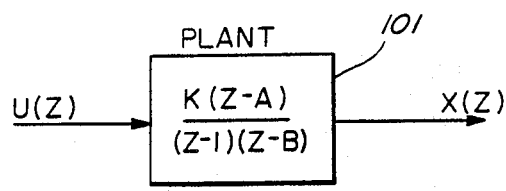
FIG. 4 is a schematic diagram of a typical system plant.

FIG. 4 shows an example of an actual plant 101, with an input voltage U(Z) resulting in an output position X(Z). The digital transfer function of this plant 101 is $$G^*(Z) = \frac{K(Z - A)}{(Z - 1)(Z - B)} \quad (1)$$

The transfer function $G^*(Z)$ represents a plant including a voltage mode amplifier, motor, load and encoder, as illustrated, for example, in FIG. 5, to be described in further detail below.

In application of the described open loop and feedback control to a digital servo positioning system, for example, for a wire bonder, the feedback control, D(z), is a standard lead-lag control based on the position error and is implemented in difference equation form, i.e., $(U_{feedback(k)} = (A_1) \text{Error}_k - (A_2) \text{Error}_{k-1} + (A_3) U_{feedback(k-)})$, where the parameters $A_1$, $A_2$, and $A_3$ are chosen to yield a stable system. While in this case a lead-lag control is employed, the feedback control can be any one of the many conventional forms used in the industry.

The open loop control is preferably generated by solving a difference equation derived from the plant model G(z), which represents the dynamics of a DC motor, amplifier, lead screw, load and encoder. The open loop difference equation is solved for $U_{openloop(k)} = (B_1) X_{k+1} - (B_2) X_k + (B_3) X_{k-1} + (B_4) U_{openloop(k-1)}$. An equation of this form is called noncausal since the computation of the present control signal, $U_{openloop(k)}$, requires the knowledge of a future event, namely $X_{k+1}$. Noncausal equations are not possible in feedback control since a future error, $E_{k+1}$ is not known. However, the open loop calculation requires the future target point, $X_{k+1}$ along the path. In a digital positioning system, such as the one under discussion, the target positions are precomputed using the well-known trapezoidal velocity profile and are thus available. If the target positions are not known in advance, then the target command could be delayed one sample period. Thus, the next target would be known one sample period before it is commanded.

To illustrate, a difference equation may be found which will predict $U_k$ for $X_{k+1}$ for the plant shown in FIG. 4. The transfer function $G^*(Z)$ is inverted as follows:

$$\frac{1}{G(Z)} = \frac{U(Z)}{X(Z)} = \frac{(Z-1)(Z-B)}{K(Z-A)} \quad (2)$$

Simplifying this equation (2) yields:

$$U_K = \frac{1}{K}[X_{K+1} - (1 + B)X_K + (B)X_{K-1} + (KA)U_{K-1}] \quad (3)$$

Thus, $U_k$ is a feed-forward value which is dependent on the plant parameters (dynamics) and the next desired position $X_{k+1}$. Equation (3) is implemented by computing element 17 in FIG. 3. Equation (3) may also be rewritten in terms of velocities $V_n$ as follows:

$$U_K = \left(\frac{1}{K}\right)[V_K - (B)V_{K-1}] + AU_{K-1} \qquad (4)$$

Figure 5:
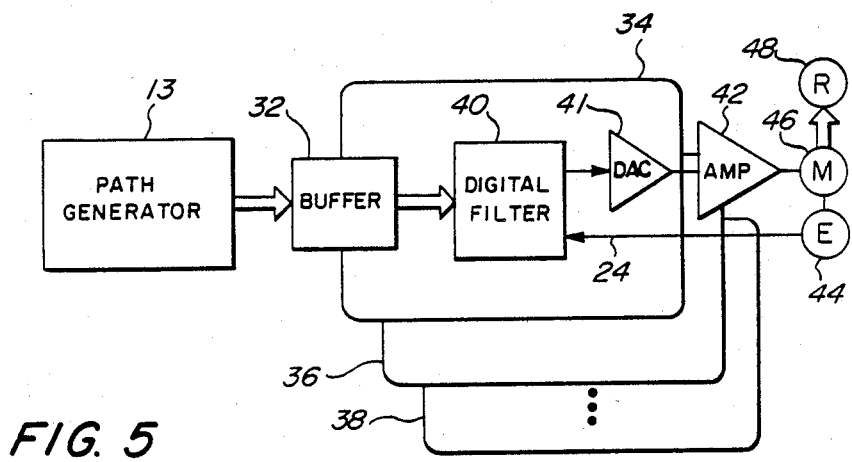
FIG. 5 is a block diagram of a hardware embodiment of the preferred embodiment.

A hardware embodiment of the preferred embodiment is illustrated in FIG. 5. This embodiment includes a path generator 13, a buffer 32, a digital control card 34, a voltage mode amplifier 42, a motor 46, and an encoder 44. The motor 46 controls movement of a robotic element or member 48 such as a mechanical arm along a selected axis, as is well-known in the art.

The digital control card or control section 34 includes a digital filter 40 embodied in, for example, a Motorola 68000 microprocessor operating at 12½ MHz. The digital filter 40 may also be embodied in various forms of digital logic, other programmed processors, or special purpose signal processor circuitry.

The digital filter 40 performs the function of the filter 17, filter 25, velocity translators 31, 39, the switch 43, the integrator 49 and the first, second and third summing junctions 19, 29 and 35 of FIG. 1. The digital filter 40 receives the path or trajectory information provided by the path generator 13 and stored in the buffer 32. The digital filter 40 outputs the total control signal $U_{total}$ to the digital-to-analog converter 41. The digital-to-analog converter 41 in turn provides an analog control signal to the amplifier 42 for controlling the motor 46. The encoder 44 tracks the actual motor position and provides a feedback signal on line 24 to the digital filter 40. The DAC 41, amplifier 42, motor 46, encoder 44, and load 48 comprise the plant 28 illustrated in FIG. 3 having the transfer function $G^*(Z)$.

As illustrated schematically by cards 36, ... 38, according to the preferred embodiment, seven additional cards and corresponding digital filters, amplifier, motor and encoder circuits may be provided in order to control up to eight-dimensional motion. Each additional card 36 ... 38 contains its own buffer 32. Each buffer 32 receives path data for controlling motion on its particular dimension. The buffer 32 of card 34 may receive X path data, buffer 32 of card 36 may receive Y path data, and the buffer 32 of card 38 may receive Z path data. Other dimensions include roll, pitch, yaw, etc., as known in the robotics art.

In an actual embodiment, a Pacific Scientific 2VM-6202-7 DC servo motor has been used for the motor 46 and a Disk Instruments rotary optical encoder M-98A-1000-ICLP yielding 4,000 counts per revolution with quadrature has been used for encoder 44. In that embodiment, the amplifier 42 is a 40-volt, 12-amp Glentek GA45555 linear voltage mode amplifier. The digital-to-analog converter 41 is a Burr-Brown AD667.

Figure 7:
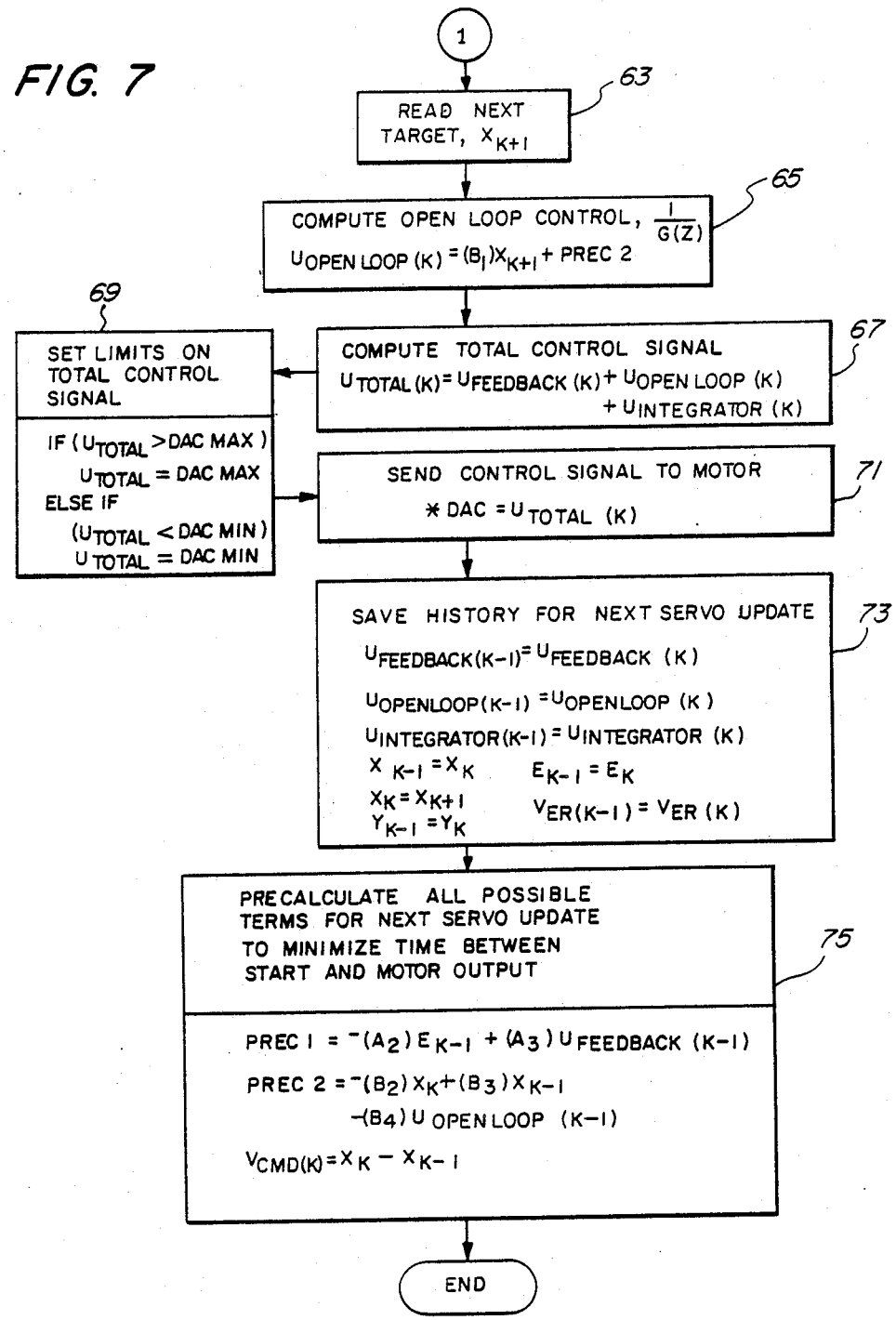

A flowchart for programming the Motorola 68000 microprocessor to perform the digital filtering functions of digital filter 40, including the function of the switch mode integrator 18, are illustrated in FIGS. 6 and 7. Performance of the routine starts at the beginning of every sample period with step 51. Execution of the filter algorithm continues sequentially with steps 57, 59, 61, etc. of FIGS. 6 and 7. The entire algorithm is computed within the sample period. The algorithm is performed autonomously by each digital filter 40 on each card 34, 36 ... 38 for the respective dimension whose path data is supplied to that card through the associated buffer 32. In an embodiment employing additional cards 36 ... 38, each additional card is synchronized to the same sample period.

The actual position of the motor 46 is indicated over line 24 and is read at step 57. In step 58, the position error, $E_k = X_k - Y_k$, is determined in accordance with the summing junction 19 in FIG. 1. Then, in steps 59 and 60, the actual velocity and velocity error are determined in accordance with the equations $\dot{Y}_{(k)} = Y_k - 1$ and $V_{er(k)} = \dot{X}_k - \dot{Y}_k$, respectively. In step 61, the feedback control D(z) is computed. This term D(z) is computed by multiplying a constant $A_1$ times the error signal $E_k$ and adding to it a quantity denoted Prec 1, which is a precalculated quantity, as described hereafter.

The flow then proceeds to a number of steps 62, 64, 66, 68, 70, which implement the switch mode integrator. At test 62, the value of $\dot{X}_k$ is tested to ascertain whether it is zero, i.e., whether the apparatus is tracking or path holding. If $\dot{X}_k = 0$, the flow proceeds to step 64, where the integrator error values are set to $E_k$ and $E_{k-1}$, respectively. If $\dot{X}_k \neq 0$, the flow proceeds to step 65, where the integrator error values are set to $V_{er(k)}$ and $V_{er(k-1)}$. Upon exiting either step 64 or 65, the flow proceeds to calculate the lead lag integrator function $U_{integrator(k)}$ at step 68. After calculating the lead lag integrator function, the flow proceeds to step 70, where limits are set on the integrator in order to prevent it from growing unbounded in the event of hardware malfunctions such as amplifier shutdown. According to step 70, if the value of $U_{integrator}$ is greater than a limit $I_{max}$ or less than a limit $I_{min}$, $U_{integrator}$ is set to the $I_{max}$ or $I_{min}$ value, respectively.

In step 63, the next target, $X_{k+1}$ is read from the buffer 32 into the processor 40. As illustrated in step 65, the open loop control parameter is calculated by multiplying a constant $B_1$ times $X_{k+1}$ and adding to it a second precalculated value Prec 2 as described hereafter. In the next step 67, the total control signal $U_{total(k)}$ is determined in accordance with the summing junction 29 in FIG. 1.

In step 69, a limit test is performed on the total control signal $U_{total}$. The signal, $U_{total}$, is compared to parameters denoted DACMAX and DACMIN and clipped if necessary. These parameters are selected to limit the input voltage signal within a range matched to the amplifier 42. The control signal $U_{total}$ is then sent to the DAC 41 and then to the amp 42 and motor 46 in step 71. The parameters determined during this servo update are saved in step 73 for the next servo update 51. The routine then proceeds to block 75, where all possible terms for the next iteration of servo update 51 are calculated to minimize the time between the beginning of the sample period, step 51, and the output of $U_{total}$ to the DAC/amp/motor, step 71. In this step 75, the two parameters previously referred to as Prec 1 and Prec 2 are calculated according to the equations established.

In a preferred embodiment, all history terms are initially set to zero. The sample period is 1 millisecond and generates a high priority interrupt to the processor 40 so that the beginning of the digital servo algorithm is synchronized to the beginning of every sample period. The path generator 13 can be run before starting the move or concurrently therewith. The path generator 13 may read out previously-stored path information, or may be a computer which calculates detailed trajectory data for a target path in response to general position commands, as desired.

Figure 8:
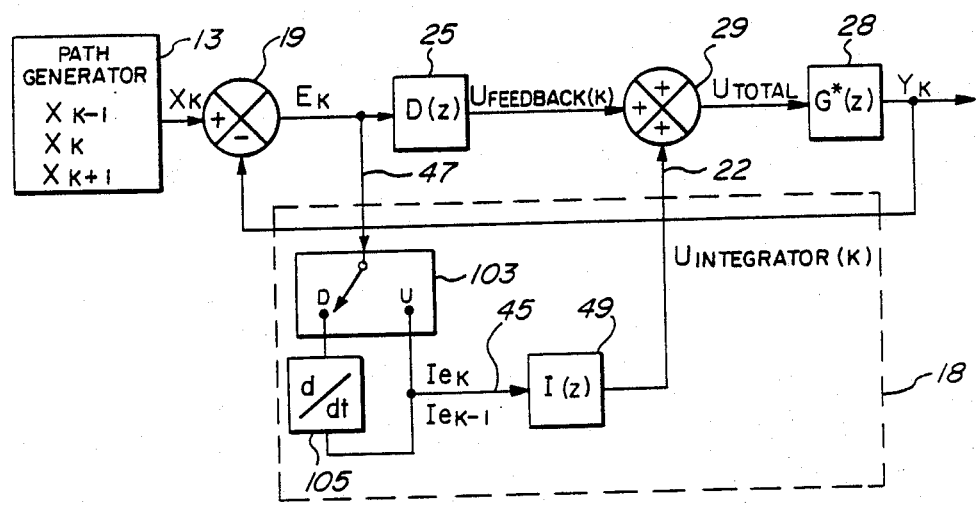
FIG. 8 is a schematic block diagram illustrating an alternate switch mode integrator embodiment.

With respect to the switch mode integrator 18 shown in FIG. 3, it may be observed that the velocity error, $V_{ek} = \dot{X}_{(k)} - \dot{Y}_{(k)} = (X_k - X_{k-1}) - (Y_k - Y_{k-1})$
$= (X_k - Y_k) - (X_{k-1} - Y_{k-1})$, could be written as $V_{ek} = E_k - E_{k-1}$. This leads to the switch mode integrator configuration of FIG. 8, which does not require the explicit computations of the commanded and actual velocities $V_{cmd(k)}$ and $V_{act(k)}$. In this embodiment, a switch 103 switches the error signal either to position "D," the input of a differentiator 105, or to position "U" connected to the input 45 of the integrator 49. The conditions governing switching by the switch 103 are as follows:

If $(X_k = X_{k-1})$
switch to "U" for holding and set
$I_{ek} = E_k$
$I_{ek-1} = E_{k-1}$
else
switch to "D" for pathtracking and set
$I_{ek} = E_k E_{k-1}$
$I_{ek-1} = E_{k-1} - E_{k-2}$ The system of FIG. 8 does not show open loop control, which may or may not be added.

According to the embodiment of FIG. 8, the integrator 49 may be viewed as having an input of position error during holding and the derivative of position error during pathtracking. Thus, the integrator 49 tries to drive the position error to zero during holding while trying to keep the position error from changing (growing) during pathtracking. This combination works very well for reducing the sensitivity of the system to external disturbances. The implementation of the switch mode integrator 18 in FIG. 8 is not used in the actual embodiment, since the commanded velocity is required for the other parts of the control logic for the system.

One feature of the switch mode integrator equation, $U_{integrator(k)} = C_1 I_{ek} - C_2 I_{e(k-1)} + U_{integrator(k-1)}$, may be noted. According to this equation, the new integrator value is always some value which is dependent on the input plus the old integrator value. This feature provided by the last integrator control value, $U_{integrator(k-1)}$, helps smooth the integrator perturbations introduced by switching the input between position and velocity error.

As will be apparent to those skilled in the art, various modifications and adaptations of the preferred embodiment may be made without departing from the scope and spirit of the invention. It is therefore to be understood that, within the scope of the appended claims, the invention may be practiced other than as specifically described herein.

What is claimed is:

1. Servo positioning apparatus for use in moving and holding a mechanical element comprising:
   means for outputting a desired position signal representative of a desired position of said element;
   means for generating a velocity error signal representing departure of the velocity of said element during movement from a desired velocity;
   a feedback loop including means for generating a position error signal related to the difference between the actual position of said element and the desired position of said element represented by said desired position signal, said feedback loop further including means for applying a transfer function to said error signal to generate a feedback control signal; and
   means receiving said position error signal as an input for generating an integrator error signal, said integrator error signal being determined in accordance with said velocity error signal during movement of said element and said position error signal during holding of said element, and for integrating said integrator error signal to generate an integrator control signal for combination with said feedback control signal.

2. The improvement of claim 1 wherein said means for generating and integrating comprises:
   an integrator means having an input for receiving an input signal to be integrated; and
   a switch means for switching said input between said position error signal and said velocity error signal.

3. The improvement of claim 2 wherein said switch means includes means for switching the input of said integrator means to receive the position error signal when the velocity of said element is zero, and for switching the input of said integrator means to receive said velocity error signal when the velocity of said element is nonzero.

4. The improvement of claim 1 wherein a series of position error signals, velocity error signals and integrator control signals are successively updated to new values by the respective position error signal generating means, velocity error signal generating means, and said means for generating and integrating, and wherein said means for generating and integrating employs a previous integrator control signal in generating an updated integrator control signal.

5. The improvement of claim 1 wherein said means for generating a position error signal includes means for generating a signal representing the actual position of said element and wherein said means for generating a velocity error signal further includes:
   reference velocity translator means for translating said desired position signal into a desired velocity signal;
   actual velocity translator means for translating said actual position signal into an actual velocity signal; and
   summer means for determining said velocity error signal by combining said desired velocity signal and said actual velocity signal.

6. The improvement of claim 1 wherein said means for generating a velocity error signal comprises differentiator means for differentiating said position error signal to determine said velocity error signal.

7. The improvement of claim 1 further including means for combining said integrator control signal with said feedback control signal to generate a control signal for controlling moving and holding of said element.

8. The improvement of claim 1 further including means for generating an open loop control signal and combining said open loop control signal with said feedback control signal and said integrator control signal for controlling moving and holding of said element.

9. A method of generating a control signal for controlling moving and holding of a mechanical element comprising the steps of:
   generating path data representing a desired path of travel of said mechanical element, said path data comprising a series of successive desired path position signals;
   generating successive actual path position signals representing the actual position of said element;
   generating a succession of position error signals representative of the difference between successive pairs of the actual position signals and the desired position signals;

generating a succession of feedback control signals from said error signals;

generating a succession of velocity error signals;

generating a succession of integrator control signals, said integrator control signals being generated utilizing an integrator error signal comprising a velocity error signal when the velocity of said element is nonzero and a position error signal when the velocity of said element is zero; and combining said feedback control signals and integrator control signals to generate an output control signal for controlling movement of said element.

10. The method of claim 9 wherein said velocity error signals are generated from said actual path and desired path position signals.

11. The method of claim 9 wherein said velocity error signals are generated by differentiating said position error signal.

12. The method of claim 9 wherein said step of generating an integrator control signal further includes the step of adding an integrator error signal to a previously generated integrator control signal to generate the next successive integrator control signal.

13. The method of claim 9 further including the step of generating a succession of open loop control signals and wherein said step of combining further includes combining said open loop control signals together with said feedback control signals and integrator control signals.

14. The method of claim 9 wherein a digital processor means is employed, the operation of said processor means being timed in accordance with a series of sample periods, and wherein said digital processor performs an interative process during iterations ... $k-1$, $k$, $k+1$ ..., the steps of each iteration comprising:

computing a said position error signal by determining the difference between one of said actual path position signals and one of said desired path position signals;

computing a said velocity error signal;

computing a said feedback control signal utilizing the computed position error signal;

performing a test to determine whether said integrator control signal should be computed using the computed velocity error signal or the computed position error signal;

computing a said integrator control signal in accordance with the result of said test; and computing a said total control signal utilizing the computed feedback control signal and the computed integrator control signal.

15. The method of claim 14 wherein said digital processor performs said iterative process each sample period utilizing updated values of said actual position signal, desired position signal and velocity error signal.

16. The method of claim 14 wherein said digital processor computes said integrator control signal according to the expression:

$$U_{integrator(k)} = C_1 I_{e(k)} - C_2 I_{e(k-1)} + U_{integrator(k-1)}$$

where $U_{integrator(k)}$ represents the integrator control signal during the iteration k, $C_1 I_{e(k)}$ represents a constant $C_1$ times the integrator error signal computed during iteration k, $C_2 I_{e(k-1)}$ represents a second constant $C_2$ times the integrator error control signal computed during the iteration $k-1$ prior to iteration k, and $U_{integrator(k-1)}$ represents the integrator control signal from the previous iteration $(k-1)$.

17. The method of claim 16 wherein, in said iterative process, said digital processor means tests the velocity of said mechanical element and selects the value of $I_{e(k)}$ to be the position error signal when velocity equals zero and the velocity error signal when velocity is unequal to zero.

18. The method of claim 17 wherein, in said iterative process, said digital processor means tests the value of $U_{integrator(k)}$ against maximum and minimum limit values.

19. The method of claim 18 wherein, in said iterative process, said digital processor means computes an actual velocity quantity by subtracting the derivative of an actual position signal for iteration $k-1$ from an actual position error signal for iteration k and further calculates velocity error by subtracting the derivative of the actual position signal for iteration k from the derivative of the desired position signal for iteration k.

20. The method of claim 19 wherein, in said iterative process, said digital processor means computes the feedback control signal by combining a quantity consisting of a constant times the position error signal for iteration k with a quantity comprising a second constant times the position error signal for the iteration $k-1$ plus a third constant times the value of iteration $k-1$.

21. The method of claim 20 wherein, in said iterative process, said digital processor means calculates an open loop control signal and adds it to the feedback control signal and integrator control signal to determine a said total control signal.

22. The method of claim 19 wherein, in said iterative process, said digital processor means saves the values determined in iteration k for the feedback control signal, the integrator control signal, the actual position signal, the desired position signal, and the velocity error signal for use in the next iteration $k+1$.

23. The method of claim 22 wherein, in said iterative process, during iteration k, said digital processor means precalculates a selected quantity for use in determining the feedback control signal in interval $k+1$.

24. The method of claim 21 wherein, in said iterative process, said digital processor means precalculates a first quantity and a second quantity, the first quantity to be used in calculating said feedback control signal in iteration $k+1$, the second quantity to be used to calculate said open loop control signal in the interval $k+1$.

25. The method of claim 23 wherein said digital processor means performs said iterative process each sample period.

26. The method of claim 24 wherein said digital processor means performs said iterative process each sample period.

* * * * *